(12) United States Patent
Namiki et al.

(10) Patent No.: US 7,347,963 B2
(45) Date of Patent: Mar. 25, 2008

(54) METHOD OF MOLDING RESIN TO PROTECT A RESOLVER WINDING

(75) Inventors: Shinichi Namiki, Tokyo (JP); Kazunori Sakamoto, Tokyo (JP)

(73) Assignee: Minebea Co., Ltd., Nagano-Ken (JP)

( * ) Notice: Subject to any disclaimer, the term of this patent is extended or adjusted under 35 U.S.C. 154(b) by 180 days.

(21) Appl. No.: 10/826,135

(22) Filed: Apr. 16, 2004

(65) Prior Publication Data

US 2005/0077650 A1    Apr. 14, 2005

(30) Foreign Application Priority Data

Apr. 16, 2003    (JP) .............................. 2003-111477

(51) Int. Cl.
*H02K 15/00* (2006.01)
*H02K 15/12* (2006.01)

(52) U.S. Cl. .............................. 264/272.2; 264/272.11; 264/272.15; 264/272.19; 264/275; 29/596; 29/597; 29/598; 425/116; 425/125

(58) Field of Classification Search ..................... None
See application file for complete search history.

(56) References Cited

U.S. PATENT DOCUMENTS

| | | | | |
|---|---|---|---|---|
| 3,813,763 A | * | 6/1974 | Church ........................ | 29/596 |
| 3,963,949 A | | 6/1976 | Church | |
| 4,452,420 A | * | 6/1984 | Lundquist ................... | 249/175 |
| 4,470,786 A | * | 9/1984 | Sano et al. ................. | 425/125 |
| 4,573,258 A | * | 3/1986 | Io et al. ........................ | 29/596 |
| 4,805,991 A | * | 2/1989 | Arai et al. ................... | 359/824 |
| 4,908,922 A | * | 3/1990 | Abe ....................... | 29/898.062 |
| 5,038,460 A | * | 8/1991 | Ide et al. ....................... | 29/596 |
| 5,466,492 A | | 11/1995 | Kiessling et al. | |
| 5,584,114 A | * | 12/1996 | McManus ..................... | 29/596 |
| 5,628,951 A | * | 5/1997 | Kitajima et al. ....... | 264/272.15 |
| 5,853,643 A | * | 12/1998 | Bauer ..................... | 264/272.15 |
| 5,973,424 A | * | 10/1999 | Engelberger et al. ......... | 310/43 |
| 6,554,598 B1 | * | 4/2003 | Tsuruta ........................ | 425/89 |
| 6,558,596 B1 | * | 5/2003 | Bienick et al. ............. | 264/154 |
| 6,645,416 B2 | * | 11/2003 | Bock et al. ................. | 264/275 |

(Continued)

FOREIGN PATENT DOCUMENTS

| | | |
|---|---|---|
| EP | 0 507 211 A2 | 10/1992 |
| JP | S55-160948 | 12/1980 |
| JP | S57-020154 A | 2/1982 |
| JP | A-60-249849 | 12/1985 |
| JP | 09234766 | * 9/1997 |

(Continued)

*Primary Examiner*—Christina Johnson
*Assistant Examiner*—Jeff Wollschlager
(74) *Attorney, Agent, or Firm*—Posz Law Group, PLC (57) ABSTRACT

At least a winding of a stator stack 2 is molded by injecting a fused resin molding material into a space formed between a top mold and a bottom mold member. When the stator stack 2 of the resolver, which is annular and includes a coiled winding 7, is sandwiched between the top mold member 10 and bottom mold member 20, a movable disc 12 is urged by a spring device 13, into close engagement with the bottom mold member 20. While the movable disc 12 is closely engaged with the bottom mold member 20, the stack 2 of the resolver is sandwiched between the bottom mold member 20 and the top mold member 10. This method prevents the generation of gaps between the stator stack 2 and mold 10, 20 due to unevenness of the thickness in the stator stack 2.

9 Claims, 5 Drawing Sheets

U.S. PATENT DOCUMENTS

| | | | |
|---|---|---|---|
| 6,750,577 B2 * | 6/2004 | Mimura | 310/71 |
| 6,756,709 B2 * | 6/2004 | Kobayashi et al. | 310/43 |
| 7,036,206 B2 * | 5/2006 | Worden et al. | 29/596 |
| 2001/0048261 A1 * | 12/2001 | Kojima et al. | 310/156.13 |
| 2002/0063491 A1 | 5/2002 | Kobayashi et al. | |
| 2003/0030349 A1 | 2/2003 | Kobayashi et al. | |
| 2004/0056383 A1 * | 3/2004 | Worden et al. | 364/272.2 |

FOREIGN PATENT DOCUMENTS

| JP | 2001-324353 A | 11/2001 |
|---|---|---|
| JP | A-2001-324353 | 11/2001 |
| JP | A-2002-171737 | 6/2002 |

* cited by examiner

METHOD OF MOLDING RESIN TO PROTECT A RESOLVER WINDING

CROSS REFERENCE TO RELATED APPLICATION

This application is based on and incorporates by reference Japanese Patent Application No. 2003-111477, which was filed on 16 Apr. 2003.

BACKGROUND OF THE INVENTION

The present invention relates to a resin molding method for protecting the winding of a resolver. The resin is to protect the winding, which is coiled around multiple magnetic poles of a stack of the resolver.

For example, consider a resolver that is used to detect a deviation angle. The resolver includes a rotatable, assembled rotor stack and a stator stack. The stator stack includes a coiled excitation winding and an output winding wound around multiple magnetic poles. The winding portion of the stator stack is typically coated with resin material such as a varnish to fix the windings and to improve the insulation properties.

However, in prior art coating methods, in which a resin material such as a varnish is applied to the winding portion, processes such as the drying of the resin material are complicated and the number of tasks include, for example, the management of the coating volume of the resin material and the management of the drying temperature. Thus, it is difficult to guarantee reliability of the protection structure of the winding portion.

Therefore, a method to protect the winding portion and a signal output portion by molding a resin layer on the winding portion and signal output portion of the resolver (resin molding method) has been proposed (see Japanese Unexamined Patent Application Publication 2001-324353 and Japanese Unexamined Patent Application Publication 2002-171737).

In a prior art molding method, at least the winding of the stack is molded by injecting a fused resin molding material into a space formed between a top mold and a bottom mold member, while the annular stack of the resolver, including a coiled winding, is sandwiched between the top mold and bottom mold member. However, in the case of thin (for example, a diameter of 0.08 mm to 0.14 mm) windings, defects such as a disconnection or a layer short circuit may occur due to the effect of environmental conditions on the resin molding material. Therefore, use of a thicker winding and use of a partial molding have been employed. However, the molding method of the prior art has additional problems as follows.

The stator stack of the resolver is structured such that thin silicon steel plates, which are press punched into an annular shape, are laminated and then adhered or crimped. There is non-uniformity in the thickness of the silicon steel plate, and this non-uniformity is accumulated across a number of the silicon steel plates. Therefore the thickness of the stator stack is not uniform. There is variation of 8 to 10% in the thickness of a single silicon steel plate. A variation equal to the number of silicon steel plates multiplied by 8 to 10% is produced in the thickness of the stator stack. Therefore, gaps are generated between the stator stack and the mold during the resin molding, and stabilization of the dimensions is difficult.

SUMMARY OF THE INVENTION

The present invention was developed by taking the above-mentioned problems into account. And one objective is to provide a resin molding method for protecting the winding of a resolver that prevents gaps between the stack and mold due to variation of the thickness in the stack to improve quality.

Another objective of the present invention is to provide a resin molding method for protecting the winding of a resolver in which even a thin winding can be effectively protected by resin to protect against a disconnection or a layer short circuit.

The present invention achieves the aforementioned objectives and is basically a resin molding method for protecting the winding of a resolver in which at least the winding of the stack is molded by injecting a fused resin molding material into a space formed between a top mold member and a bottom mold member, when a ring-shaped stack of the resolver with a coiled winding is sandwiched between the top mold member and the bottom mold member. There is a movable part to which resilience is imparted by a spring device on either of the top mold or bottom mold member. While the movable part is engaged with the opposing mold member, the stack of the resolver is sandwiched between the mold members.

In another aspect of the invention, there exists a resin molding method for protecting the winding of a resolver characterized in that a cylindrical projection of one of the mold members extends into an inner opening of the resolver stack, and the movable part is engaged with the cylindrical projection.

Therefore, even if there is unevenness in the thickness of the stack, while the movable part is engaged with the opposed mold member, the mold members accommodate any unevenness in the thickness of the stack. This ensures that the stack is always held between the mold parts. Consequently, leakage of the resin molding material is prevented, which improves the quality of the resulting product.

In another aspect of the invention, there exists a resin molding method for protecting the winding of the resolver characterized in that a co-polymerizing polyester hot melt, which has no glass transition point within the range of temperatures to which the resolver is exposed, is used as the resin molding material.

Therefore the resin molding material is not affected by the environmental conditions. Thus, even when the winding of a resolver with thin windings is coiled, it is effectively protected by the resin molding material, which prevents the generation of defects such as a disconnection or a layer short circuit of the windings.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1:
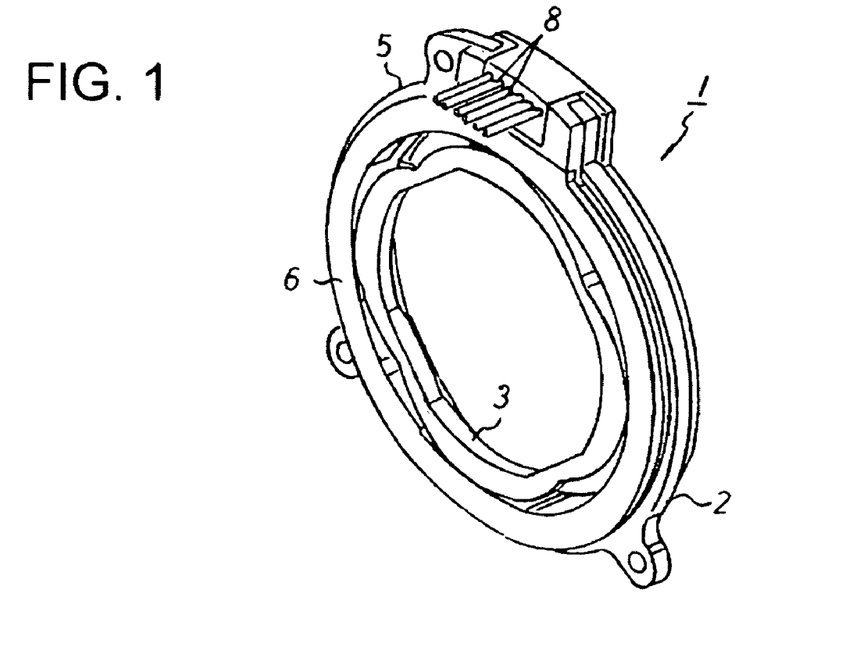
FIG. 1 is a perspective view of a resolver in accordance with the present invention.

First, the structure of the resolver will be described with reference to FIGS. 1 to 4. The resolver 1 shown in FIG. 1 is used to detect deviation angles and the like and includes an annular rotor stack 3, which is installed in a rotatable manner inside an annular stator stack 2.

Figure 3:
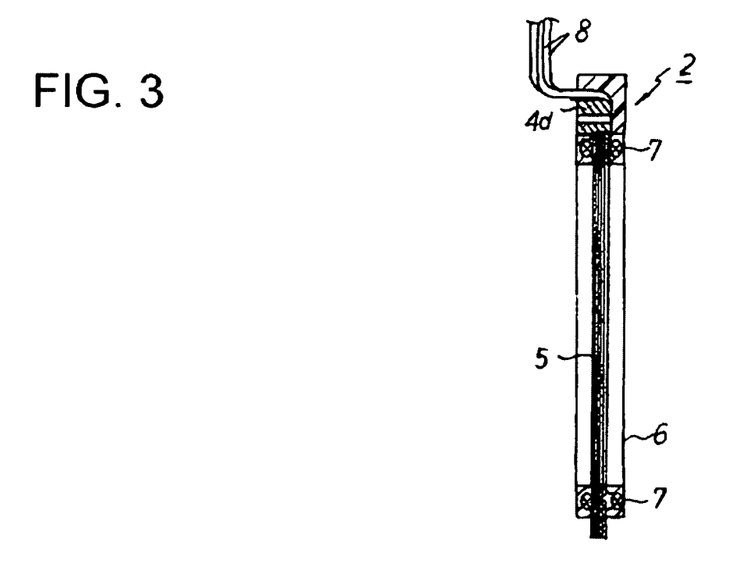
FIG. 3 is a cross sectional view taken along the plane indicated by the line 3-3 of FIG. 2.
Figure 4:
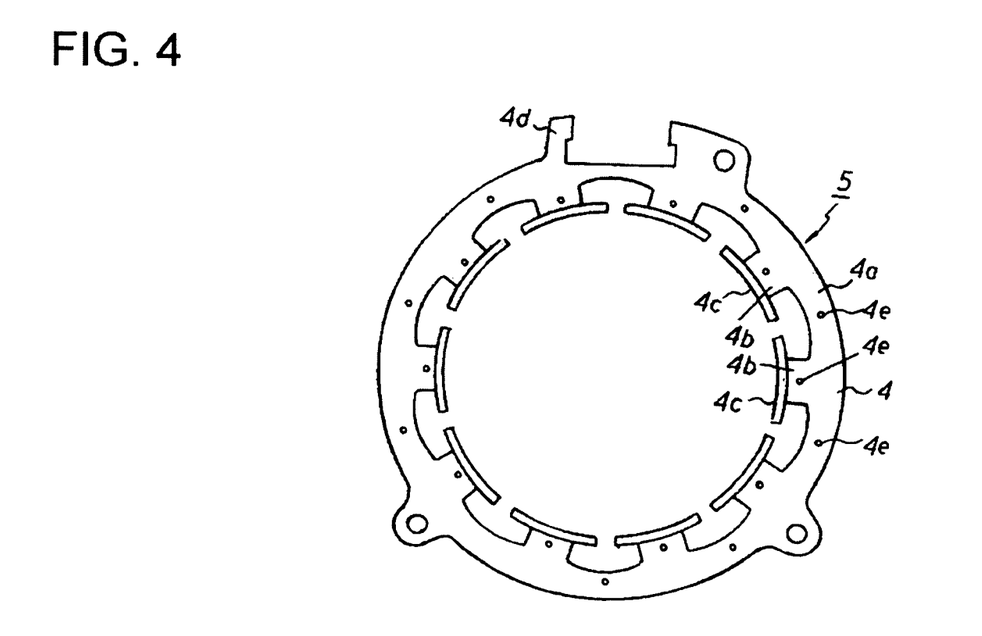
FIG. 4 is a plan view of a stator core of the stator stack of FIG. 2.

The stator stack 2 is formed such that, multiple yoke plates 4, which are made by press punching thin silicone steel plates into the shape shown in FIG. 4, are laminated and fixed with crimping to create a stator core 5 with a designated thickness. A winding portion and signal output portion of the stator core 5 (described later) are molded by resin molding material 6, which is an insulation material (see FIGS. 1 to 3.).

As shown in FIG. 4, fixed magnetic poles 4b (ten in the drawing), which project radially inward from the internal surface of a yoke body 4a. Arcuate teeth 4c are formed integrally on the tips of each fixed magnetic pole 4b. In addition, a signal output portion 4d is provided integrally on a portion of the periphery of the yoke body 4a. The signal output portion projects in an outward direction as shown. Also multiple dowels 4e for crimping are formed on the yoke body 4a and fixed magnetic poles 4b of the yoke plates 4.

Windings (excitation winding and output winding) 7 are coiled around each of the fixed magnetic poles 4b of the stator core 5, as shown in FIG. 3. Multiple lead lines 8, which are connected to the windings 7, are led out from the signal output portion 4d.

The stator stack 2 is structured by molding a protective coating of the resin molding material 6 on the winding portion of the stator core 5 (the magnetic poles about which the windings 7 are coiled) and the signal output portion 4d.

In the preferred resin molding method, a winding portion and output signal portion 4d of the stack 2 are molded by injecting a fused resin molding material into a space formed between a top mold member 10 and a bottom mold member 20 from an injection molder, which is not illustrated, when the ring-shaped stack 2 of the resolver 1 and a coiled winding 7 are sandwiched between the top mold member 10 and bottom mold member 20.

Figure 5:
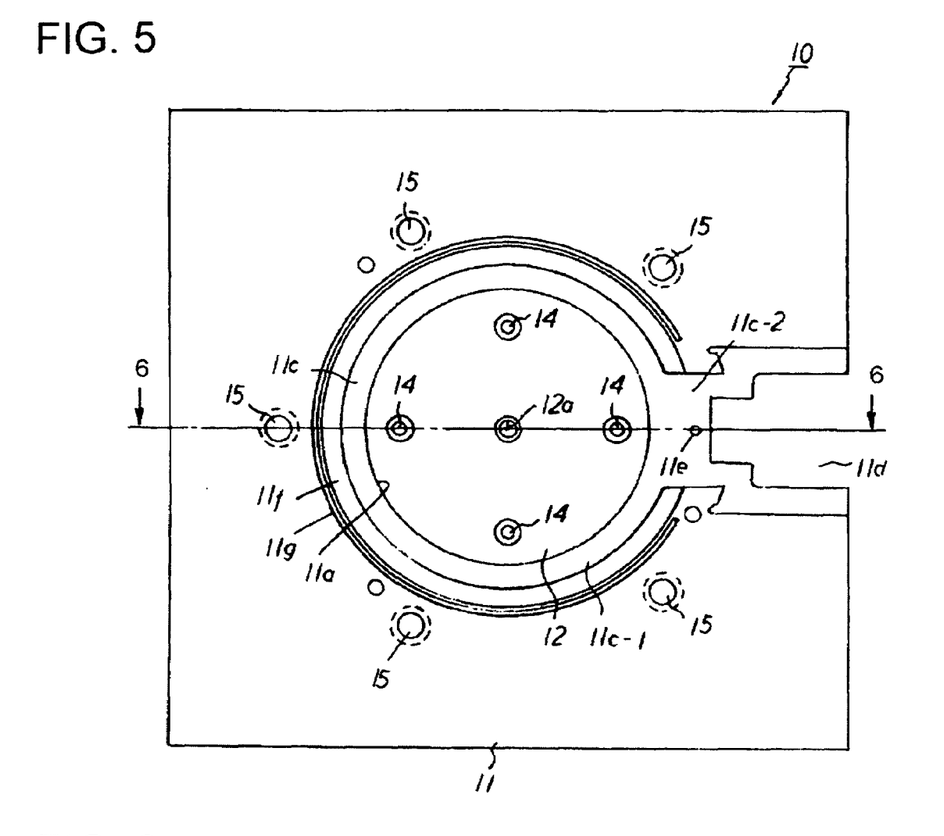
FIG. 5 is a bottom plan view of a top mold member.
Figure 6:
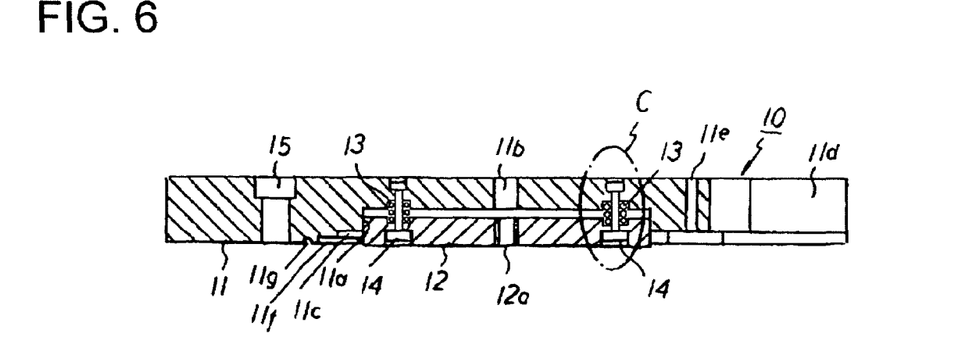
FIG. 6 is a cross sectional view taken along the plane indicated by the line 6-6 of FIG. 5.
Figure 7:
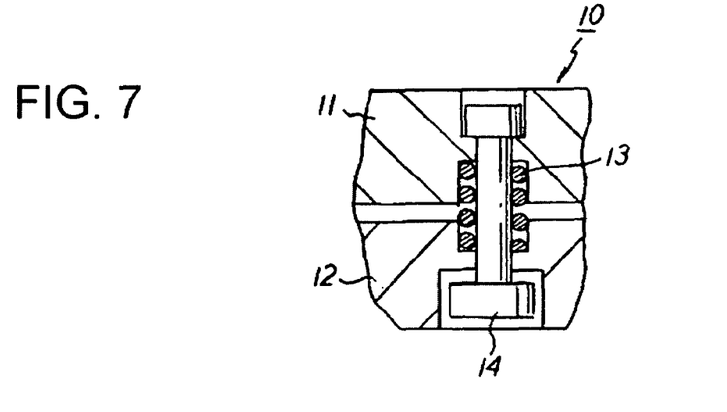
FIG. 7 is an enlarged view of a window C of FIG. 6.

As shown in FIGS. 5 and 6, a circular recess 11a, the diameter of which is approximately equal to the internal diameter of the stack 2, is formed in the center of the bottom of a body 11 of a top mold member 10. A movable part 12, which is disc-shaped, is fitted in the circular recess 11a and can move in an axial direction (vertical direction in FIG. 6). Multiple springs 13 urge the disc in a downward direction.

In other words, the movable disc 12 is attached with multiple pins 14 (four in the illustrated example) to the body 11 so that it can be moved in the axial direction. The springs 13 are coiled around the pins 14, respectively, as shown. Therefore, as shown in FIGS. 5 and 6, when the top mold member 10 is not connected to the bottom mold member 20, a gap is formed between the body 11 and movable disc 12 in the circular recess 11a, and the gap is set to a dimension that is greater than the variation of the thickness of the stack 2. A threaded hole 12a is formed in the center of the movable disc 12, and a through-hole 11b is formed in the body 11 in alignment with the threaded hole 12a.

An inner groove 11c, which covers one side of the winding portion and signal output portion 4d of the stack 2 during molding, is formed outward of the circular recess 11a of the top mold member 10. The inner groove 11c includes an annular portion 11c-1, which covers one side of the winding portion of the stack 2, and a radial portion 11c-2, which covers one side of the output signal portion 4d of the stack 2. A notch 11c is formed on the radial portion 11c-2 of the groove 11c. A teeming hole 11e, which extends in the vertical direction of FIG. 6, opens on the surface of the body 11.

In addition, an annular outer groove 11f, which contacts a side of the stack 2 (stator core 5) during molding, is located outward from the inner groove 11c. A small annular groove 11g is located outward from the outer groove 11f, as shown.

As shown in FIGS. 5 and 6, a plurality (five in the illustrated example) of leveled bolt holes 15 are provided outside of the groove 11g in the top mold member 10.

Figure 8:
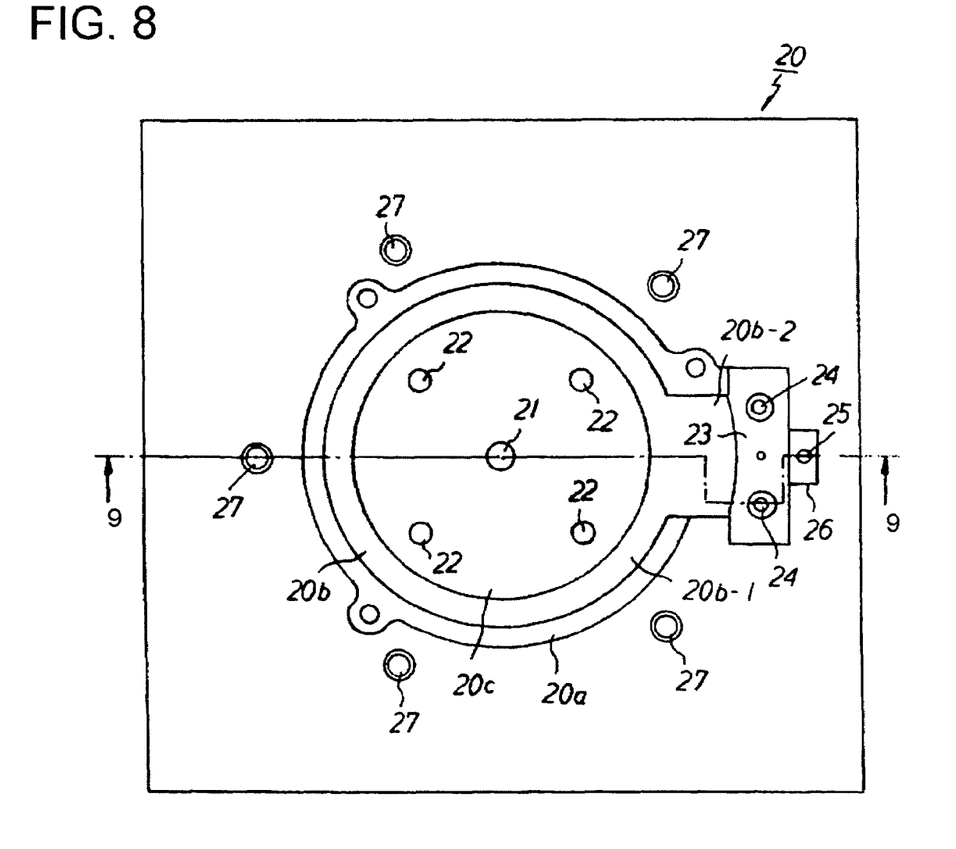
FIG. 8 is a top plan view of a bottom mold member.
Figure 9:
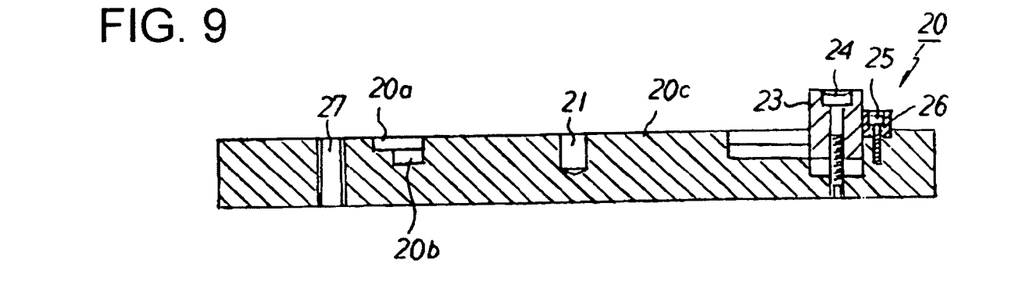
FIG. 9 is a cross sectional view taken along the plane indicated by the line 9-9 of FIG. 8.
Figure 10:
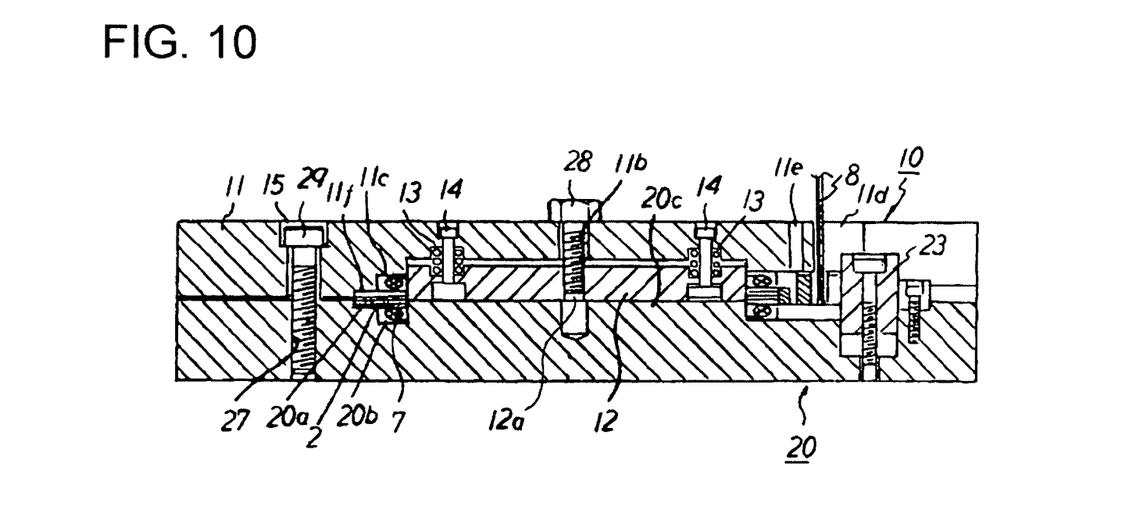
FIG. 10 is a cross sectional view of a mold in a molding state.

As shown in FIGS. 8 and 9, an annular outer groove 20a, which corresponds to the outer groove 11f of the top mold member 10, is formed in the top of a bottom mold member 20. The external diameter of the outer groove 20a is approximately equal to the external diameter of the stack 2. Also, an inner annular groove 20b of the bottom mold member 20, which corresponds to the inner annular groove 11c of the top mold member 10, is formed in the top of the bottom mold member 20 along the internal edge of the outer annular outer groove 20a. As a result, a cylindrical projection 20c, the diameter of which is approximately equal to the internal diameter of the stack 2, is formed at the center of the bottom mold member 20, as shown in FIG. 9. The outer groove 20a of the bottom mold member 20 contacts the side of the stack 2 (stator core 5) during molding, as shown in FIG. 10, and the inner groove 20b covers one side of the winding portion and signal output portion 4d of the stack 2. The inner groove 20b of the bottom mold member 20 includes an annular portion 20b-1, which covers one side of the winding portion of the stack 2, and a radial portion 20b-2, which covers one side of the signal output portion 4d of the stack 2.

A central air escape hole 21 is formed in the center of the cylindrical projection 20c of the bottom mold member 20, and a plurality (four in the illustrated example) of additional air escape holes 22 are formed around the central air escape hole 21. A catch piece 23, which serves to catch the outer edge of the signal output portion 4d of the stack 2, is mounted with two bolts 24 on the radial portion 20b-2 of the inner groove 20b of the bottom mold member 20. The catch piece 23 is aligned by an alignment piece 26, which is fastened by a bolt 25.

Furthermore, as shown in FIGS. 8 and 9, lower threaded holes 27, the number of which corresponds to the number of upper bolt holes 15 in the top mold member 10, are formed around the outer groove 20a in the bottom mold member 20 to align with the upper bolt holes 15.

As mentioned above, the winding portion and the signal output portion 4d of the stack 2 are resin molded using the top mold member 10 and the bottom mold member 20. First, as shown in FIG. 10, the stack 2 (stator core 5) is fitted on the bottom mold member 20. That is, the internal edge of the stack 2 is fitted on the cylindrical projection 20c of the bottom mold member 20, and one side of the stack 2 contacts the outer groove 20a of the bottom mold member 20. The external edge of the signal output portion of the stack 2 is caught by the catch piece 23.

Next, the top mold member 10 is placed over the bottom mold member 20 with the movable disc 12 facing down. Then the movable disc 12 is closely fitted to the top of the cylindrical projection 20c due to the force of the springs 13. At the same time, the outer groove 11c of the top mold member 10 contacts the side of the stack 2 (stator core 5). If the thickness dimension of the stack 2 varies, the body 11, other than the movable disc 12 of the top mold member 10, can be vertically moved to accommodate unevenness in thickness of the stack 2, while the movable disc 12 of the top mold member 10 is maintained in close fitting engagement with the bottom mold member 20. Therefore, the vertical movement of the body 11 absorbs any unevenness (variation) in the thickness of the stack 2. This ensures the engagement of both sides of the stack 2 between the outer groove 11f of the top mold member 10 and the outer groove 20a of the bottom mold member 20. Therefore, no gap is formed between the top mold member 10 and the stack, and no gap is formed between the bottom mold member 20 and the stack 2. The total axial dimension of the space created by the grooves 11f and 20a as measured in the vertical direction of FIG. 10 is designed to be a slightly less than the thickness of the stack 2.

As described above, when the top mold member 10 is placed on the bottom mold member 20, the movable disc 12 is held against the bottom mold member 20 by inserting a bolt 28 in a bolt hole 11b, which is formed in the body 11, and threading the bolt 28 into a threaded hole 12a, which is formed in the movable disc 12. Force of the bolt holds the movable disc 12 against the bottom mold member 20, and the close fit between the movable disc 12 and the bottom mold member 20 is maintained.

The top mold member 10 and the bottom mold member 20 are held together by bolts 29, which fit respectively in a plurality of bolt holes 15 formed in the top mold member 10. The bolts 29 are threaded into threaded holes 27 formed in the bottom mold member 20. When the mold members 10, 20 are held together, the winding portion and the signal output portion 4d of the stack 2 face the space that is formed by the inner groove 11c of the top mold member 10 and the inner groove 20b of the bottom mold member 20. Multiple lead lines 8 are led through the notch lid of the top mold member 10.

When the stack 2 is sandwiched between the top mold member 10 and the bottom mold member 20, a fused resin mold material in injected into the space formed between the top mold member 10 and the bottom mold member 20 from an injected molder (not shown). When fused resin molding material appears at the teeming hole lie formed on the top mold member 10, the fused resin molding material fills the space formed between the top mold member 10 and the bottom mold member 20.

Figure 2:
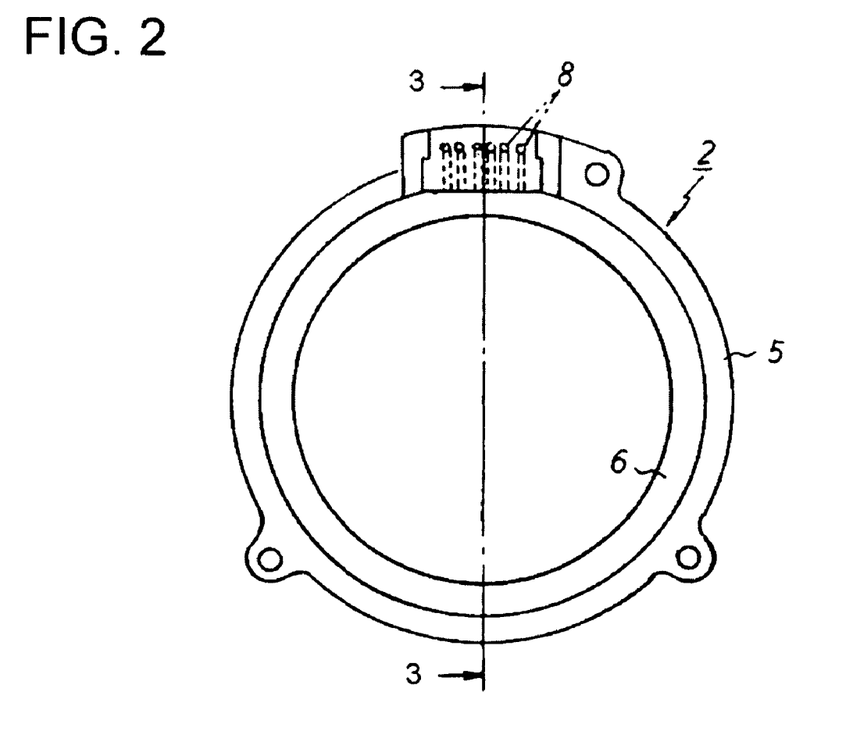
FIG. 2 is a plan view of a stator stack of the resolver of FIG. 1.

When the fused resin molding material is cooled and solidified, the top mold member 10 and the bottom mold member 20 are disassembled and the stack 2 is removed. Then, the winding portion and the signal output portion 4d of the stack 2 are molded with the resin molding material 6 as shown in FIGS. 1 to 3.

A co-polymerizing polyester hot melt that has no glass transition point within the range of temperatures to which the resolver is exposed is used as the resin molding material 6. The glass transition point temperature of the co-polymerizing polyester hot melt is −70° C. The glass transition point temperature of PBT (polybutylene telephtalate), which is a frequently chosen material for molding stators, is 10° C.

In the method of the present invention, even if there is unevenness in the stack 2, the movable disc 12 mounted on the top mold member 10 of the body 11 is closely engaged with the bottom mold member 20. The body 11 of the top mold member 10 is allowed to move vertically with respect to the movable disc 12 to accommodate the unevenness in the stack 2. Therefore, the stack 2 is always engaged between the body 11 and the bottom mold member 20. Therefore, no gap is created between the stack 2 and the top mold member 10 and between the stack and the bottom mold member 20. Thus, there is no flow of the resin molding material 6 into such a gap. Consequently, leakage of the resin molding material 6 is prevented, which stabilizes the quality of the stack 2 and the resolver 1.

Therefore, with the present invention, a co-polymerizing polyester hot melt, which has no glass transition point within the range of temperatures to which the resolver is exposed, is used as the resin molding material 6. Therefore the resin molding material 6 is not affected by the environmental conditions to which the resolver is exposed. Thus, even when the winding of the resolver 1 has thin windings, the windings are protected by the resin molding material 6, and defects, such as a disconnection or a layer short circuit of the windings 7, are prevented.

In addition, when the winding portion of the stack 2 is protected by the resin molding material 6, a coating such as varnish, to fix the windings and improve the insulation, is no longer required. Thus, management of the coating volume and management of the drying temperature is simplified, and the number manufacturing processes and quality control processes is reduced, which lowers costs.

Further, the protection of the winding of stack 2 by resin molding material 6 improves the durability (environmental endurance) against, for example, dust, oscillations or impact.

In the illustrated embodiment, the movable disc 12 is provided on the top mold, however, having the movable disc 12 on the bottom mold member provides the same result.

The disclosure is intended to explain how to fashion and use various embodiments in accordance with the invention rather than to limit the true, intended and fair scope and spirit thereof. The forgoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A resin molding method for protecting a winding of a resolver comprising:
   providing a first mold member, a second mold member, and a movable part, wherein the movable part is disc shaped and is attached with multiple pins to a body of the first mold member so that the movable part can be moved in an axial direction with respect to the mold members;
   urging the movable part toward the second mold member with springs such that the movable part is closely engaged with the second mold member while an annular stator of the resolver is sandwiched between the mold members in a manner such that the annular stator surrounds the movable part;

injecting a fused resin molding material into a space formed between the first mold member and the second mold member, when the stator, which includes the winding, is sandwiched between the first mold member and the second mold member to cover the winding with the molding material;

wherein the method further includes locating the pins within the springs.

2. The method according to claim 1, wherein a cylindrical projection of the second mold member extends into an inner opening of the stator, and the movable part is closely engaged with the cylindrical projection during the injecting.

3. The method according to claim 1, wherein the molding material is a co-polymerizing polyester hot melt that has no glass transition point within a range of temperatures to which the resolver is normally exposed.

4. The method according to claim 2, wherein the molding material is a co-polymerizing polyester hot melt that has no glass transition point within a range of temperatures to which the resolver is normally exposed.

5. The method according to claim 1, wherein the movable part is fitted within an inner opening of the stator during the injecting.

6. A resin molding method for protecting a winding of a resolver comprising:

providing a first mold member, a second mold member, and a movable part, wherein the movable part is disc shaped and is attached with multiple pins to a body of the first mold member so that the movable part can be moved independently with respect to the mold members in an axial direction;

urging the movable part toward the second mold member with springs such that the movable part is closely engaged with the second mold member while an annular stator of the resolver is sandwiched between the mold members in a manner such that the annular stator surrounds and contacts and outer surface of the movable part;

injecting a fused resin molding material into a space formed between the first mold member and the second mold member, when the stator, which includes a coiled winding, is sandwiched between the first mold member and the second mold member to cover the winding with the fused resin molding material;

wherein the method further includes locating the pins within the springs.

7. The method according to claim 6, wherein a cylindrical projection of the second mold member extends into an inner opening of the stator, and the movable part is closely engaged with the cylindrical projection during the injecting.

8. The method according to claim 6, wherein the molding material is a co-polymerizing polyester hot melt that has no glass transition point within a range of temperatures to which the resolver is normally exposed.

9. The method according to claim 7, wherein the molding material is a co-polymerizing polyester hot melt that has no glass transition point within a range of temperatures to which the resolver is normally exposed.

* * * * *